United States Patent Office 3,087,958
Patented Apr. 30, 1963

3,087,958
PREPARATION OF TRIALKYL PHOSPHITES
Marvin J. Hurwitz, Elkins Park, and Andrew Carson, Southampton, Pa., assignors to Rohm & Haas Company, Philadelphia, Pa., a corporation of Delaware
No Drawing. Filed Feb. 26, 1962, Ser. No. 175,794
7 Claims. (Cl. 260—461)

This invention relates to the preparation of trialkyl phosphites. More specifically, this invention relates to a method for making trialkyl phosphites which comprises reacting phosphorus trichloride, an alcohol, and ammonium carbamate.

Conventionally, trialkyl esters of phosphorus acid are prepared from phosphorus trichloride and an alcohol in the presence of an acid binding agent, such as amines, ammonia, or alcoholates. Such methods present serious shortcomings because of problems associated with the high exotherm occurring during the reaction. Generally, processing is made very difficult and only low yields of product are obtained. In an attempt to overcome these limitations, methods have been proposed in which the phosphorus trichloride and the aliphatic alcohol are first reacted, and then when the reaction is complete, the reaction mixture is neutralized with ammonia. But this reaction, too, only succeeds when extremely low temperatures are maintained. The present method overcomes many of these difficulties and approaches ideal conditions for the preparation of trialkyl phosphites.

The method of the invention comprises reacting phosphorus trichloride, an alkanol, ROH, and an ammonium carbamate having the formula

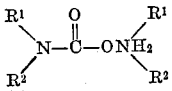

In the alkanol, the symbol R represents an alkyl group, preferably an alkyl group having 1 to 6 carbon atoms. Typical alkanols which may be employed are the following: methanol, ethanol, n-propanol, isopropanol, isobutanol, butanol, 3-methyl-butanol, 2-methylpentanol, hexanol, and the like. Mixtures of these and other alcohols may be employed.

In the ammonium carbamate, the symbols $R^1$ and $R^2$ represent each an alkyl group, preferably a lower alkyl group, such as up to 4 carbon atoms, or a hydrogen atom. The alkyl group may be the same or different. Advantageously, both the symbols $R^1$ and $R^2$ are hydrogen. Typical useful ammonium carbamate compounds are the following: ammonium carbamate, N,N-dimethylammonium-N',N'-dimethylcarbamate, N,N-diethylammonium-N',N'-diethylcarbamate, N,N-dibutylammonium-N',N'-dibutylcarbamate, and the like. The substituted carbamates can be considered as the equivalents to the ammonium carbamate. For practical reasons, ammonium carbamate is preferred. It is most advantageous when the ammonium carbamate is in the anhydrous form.

The temperature at which the reaction is carried out is not critical. The reaction proceeds with an adequate exotherm for the reaction which is not so excessive as to require the extreme cooling and low temperature associated with the prior art. For practical reasons, it is preferred to operate at a temperature in the range from −10° to 60° C., short of the temperature at which the ammonium carbamate is decomposed, and below the boiling point of the alkanol. Generally satisfactory operative temperatures range from 0° to 40° C. The temperature is conveniently regulated by the speed of addition of the phosphorus trichloride to the mixture of the other two reactants. Preferably, there is employed an inert, organic liquid medium as a vehicle for the reaction. Theoretical considerations require three moles of alkanol per mole of phosphorus trichloride. An excess of as much as 100% or more of the alkanol may be employed when it is desired to use it as the liquid medium. The amount of ammonium carbamate which is employed is 1.5 mole per mole of phosphorus trichloride; in practice an excess may be used. The advantages of the new method reside, amongst others, in the ready availability of the starting materials, the convenience of manufacturing conditions, including the ease of product isolation, and the excellent yields obtained.

The following examples are non-limiting illustrations of the invention. All parts are by weight.

Example 1

To a two-liter, three-necked flask, equipped with a stirrer, thermometer, inert gas inlet, and a dropping funnel, there are charged 207 parts of anhydrous ethanol and 140 parts of ammonium carbamate. Stirring is begun and the mixture is cooled to 0° C. while an atmosphere of dry nitrogen is maintained in the flask. Gradual addition of phosphorus trichloride is begun and the temperature is maintained at −10° to 20° C., preferably at 0° to 5° C. by application of cooling and the regulation of the rate of addition of the phosphorus trichloride. After the addition of the trichloride is terminated, the reaction slurry is treated with about 430 parts of water to dissolve the ammonium chloride by product. The upper organic phase of triethyl phosphite is separated, washed with fresh water, and then dried over 27 parts of anhydrous magnesium sulfate. A yield of 125 parts of essentially pure triethyl phosphite is recovered.

Example 2

The procedure of Example 1 is followed, there being substituted for the ammonium carbamate 240 parts of N,N-dimethyl ammonium-N',N'-dimethylcarbamate in the charge. Phosphorus trichloride is gradually added and the reaction is carried out at about 10° C. When the exotherm subsides, the reaction slurry is washed with water to dissolve the dimethylamine hydrochloride and the triethyl phosphite is separated and dried.

Example 3

Ammonium carbamate, 281 parts (3.6 moles), methyl alcohol, 211 parts (6.6 moles), carbon tetrachloride, 800 ml., and a trace of methyl orange indicator are combined in a 3-liter flask equipped with a stirrer thermometer, addition funnel, and means for introducing an inert gas atmosphere. Phosphorus trichloride, 265 parts (0.2 moles), is gradually added to the stirred mixture over a six hour period while the reaction temperature is maintained in a range of 0° to 5° C. A yellow color is maintained in the reaction mixture throughout the addition. After completion of the addition, the reaction slurry is treated with 500 ml. of water to dissolve ammonium chloride by product. The lower carbon tetrachloride layer is separated and dried over anhydrous magnesium sulfate. The carbon tetrachloride solvent is removed by distillation through a Vigreaux column. The residue, 176 parts, is essentially pure trimethyl phosphite.

Example 4

Following the procedure of Example 3, there is reacted the following: 459 parts (4.5 moles) of n-hexyl alcohol, 140 parts (1.8 mole) of ammonium carbamate, and 132.5 parts (1 mole) of phosphorus trichloride. The product is trihexyl phosphite.

We claim:
1. A process for the preparation of a trialkyl phosphite having the formula

which comprises reacting phosphorus trichloride, an alkanol,

ROH and an ammonium carbamate having the formula

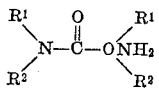

in which the symbol

R represents an alkyl group having 1 to 6 carbon atoms, and $R^1$ and $R^2$ are selected from the group consisting of a lower alkyl group and a hydrogen atom.

2. The process of claim 1, in which in the formula for the ammonium carbamate, $R^1$ and $R^2$ are hydrogen atoms.

3. The process of claim 1, in which in the formula for the alkanol, R is ethyl.

4. The process of claim 1, in which in the formula for the alkanol, R is ethyl, and in which in the formula for the ammonium carbamate, $R^1$ and $R^2$ are hydrogen atoms.

5. The process of claim 1, in which in the formula for the alkanol, R is methyl, and in which in the formula for the ammonium carbamate, $R^1$ and $R^2$ are hydrogen atoms.

6. The process of claim 1, in which the temperature of reaction is in the range of 0° to 40° C.

7. The process of claim 1, in which the reaction temperature is in the range of —10° to 60° C. and short of the decomposition temperature of the ammonium carbamate.

No references cited.